(12) United States Patent
Iwanaga et al.

(10) Patent No.: US 9,469,331 B2
(45) Date of Patent: Oct. 18, 2016

(54) VEHICLE STEERING APPARATUS

(71) Applicant: AISIN SEIKI KABUSHIKI KAISHA, Kariya-shi, Aichi-ken (JP)

(72) Inventors: Soichiro Iwanaga, Kariya (JP); Yasuaki Kurokawa, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/723,877

(22) Filed: May 28, 2015

(65) Prior Publication Data

US 2015/0344063 A1 Dec. 3, 2015

(30) Foreign Application Priority Data

May 29, 2014 (JP) ................................. 2014-110718

(51) Int. Cl.
B62D 1/189 (2006.01)
B62D 1/181 (2006.01)
B62D 1/185 (2006.01)

(52) U.S. Cl.
CPC ............... *B62D 1/189* (2013.01); *B62D 1/181* (2013.01); *B62D 1/185* (2013.01)

(58) Field of Classification Search
CPC ....... B62D 1/189; B62D 1/185; B62D 1/181
USPC .......................................................... 74/493
See application file for complete search history.

(56) References Cited

U.S. PATENT DOCUMENTS

| | | | | |
|---|---|---|---|---|
| 5,152,627 A * | 10/1992 | Arnold | .................. | B62D 1/185 403/109.3 |
| 5,199,319 A * | 4/1993 | Fujiu | ..................... | B62D 1/184 280/775 |
| 5,787,759 A * | 8/1998 | Olgren | .................. | B62D 1/184 280/777 |
| 6,637,771 B2 * | 10/2003 | Yoshimoto | ............. | B62D 1/181 280/775 |
| 7,150,204 B2 * | 12/2006 | Uphaus | ................. | B62D 1/184 280/775 |
| 2009/0000417 A1 * | 1/2009 | Oshita | ................... | B62D 1/181 74/493 |
| 2011/0163524 A1 * | 7/2011 | Aota | ..................... | B60R 16/027 280/779 |
| 2013/0074638 A1 * | 3/2013 | Morinaga | .............. | B62D 1/181 74/493 |
| 2014/0182410 A1 * | 7/2014 | Sakata | .................... | B62D 1/18 74/493 |
| 2014/0346761 A1 * | 11/2014 | Schnitzer | ................ | B62D 1/16 280/779 |

FOREIGN PATENT DOCUMENTS

JP 2009-101781 A 5/2009
JP 2012-081809 A 4/2012

* cited by examiner

*Primary Examiner* — Darlene Condra
(74) *Attorney, Agent, or Firm* — Buchanan Ingersoll & Rooney PC

(57) ABSTRACT

A steering apparatus for a vehicle capable of adjusting an operating position of a steering wheel with respect to a vehicle body, includes: a steering column supporting the steering wheel at a rear end, arranging a center of oscillation with respect to the vehicle body in front thereof, and supporting the steering wheel so as to oscillate around the center of oscillation; a fixing bracket holding the steering column between opposing holding sections extending to a lower part and fixing an upper part to the vehicle body; and a support mechanism interposed between the holding sections and the steering column and supporting the steering column to in a manner that the steering column is slidable, wherein the support mechanism includes a spring member interposed between one of the holding sections and the steering column and a rigid body interposed between the other of the holding sections and the steering column.

8 Claims, 2 Drawing Sheets

VEHICLE STEERING APPARATUS

CROSS REFERENCE TO RELATED APPLICATIONS

This application is based on and claims priority under 35 U.S.C. §119 to Japanese Patent Application 2014-110718, filed on May 29, 2014, the entire contents of which are incorporated herein by reference.

TECHNICAL FIELD

This disclosure relates to a vehicle steering apparatus, in particular, a steering apparatus in which a steering column is supported so as to be able to oscillate with respect to a vehicle body.

BACKGROUND DISCUSSION

A steering apparatus is known in which a steering column is supported so as to be able to oscillate with respect to a vehicle body and includes a tilt mechanism that is able to adjust an operating position of a steering wheel, for example, JP2012-81809A (Reference 1) aims to provide "a steering apparatus where it is possible to easily assemble a steering column and reliably hold the steering column using a pressing mechanism after assembly" (disclosed in Reference 1(paragraph [0005])), and discloses "a steering apparatus for a vehicle including a steering column which supports a steering wheel at a rear end, arranges a center of oscillation with respect to a vehicle body is arranged in front thereof, and supports the steering wheel so as to be able to oscillate around the center of oscillation, a fixing bracket which holds the steering column between a pair of opposing holding sections which extend to a lower part and fixes an upper part to the vehicle body, and a pair of pressing mechanisms which are interposed respectively between the pair of holding sections of the fixing bracket and the steering column and pressedly support the steering column to freely slide, and in which it is possible to adjust the operating position of the steering wheel with respect to the vehicle body, in which at least one of the pair of pressing mechanisms includes a sliding member which is movably supported on the holding section of the fixing bracket and holds the steering column to freely slide, a biasing means which is interposed between the sliding member and the holding section and biases the sliding member so as to be press the steering column, and an engaging and disengaging means for selecting a locking position where the sliding member is locked to the holding section to resist the biasing force of the biasing means, or a release position at which a locking state of the sliding member to the holding section is released (disclosed in Reference 1 (paragraph [0006])).

In the steering apparatus described in Reference 1, at least one pressing mechanism includes a sliding member and a biasing means, for example, a spring member is used as the biasing means, thereby a steering column is held so as to freely slide with respect to a holding section of a fixing bracket, but even if it is possible to configure an aspect where an engaging and disengaging means is provided further to only one pressing mechanism, being held by being biased by a spring member from both sides of the steering column is a typical configuration as described in the embodiment in Reference 1. In such a configuration, it is necessary to stabilize holding pressure on both sides of the steering column using two spring members in order to appropriately set a center position of the steering column and improve left and right vibration rigidity. However, as described in Reference 1, in the configuration where the steering column is supported in a state of being biased from both sides by the spring member or an elastic body, since it is highly difficult to stabilize the holding pressure using biasing force on both sides and variation in manufacturing also greatly affects, it is difficult to set the center position of the steering column and further improvement in left and right vibration rigidity is desired.

SUMMARY

Thus, a need exists for a steering apparatus for a vehicle which is not suspectable to the drawback mentioned above.

An aspect of this disclosure is directed to a steering apparatus for a vehicle, capable of adjusting an operating position of a steering wheel with respect to a vehicle body, including a steering column which supports the steering wheel at a rear end, arranges a center of oscillation with respect to the vehicle body in front thereof, and support the steering wheel so as to be able to oscillate around the center of oscillation, a fixing bracket which holds the steering column between a pair of opposing holding sections which extend to a lower part and fixes an upper part to the vehicle body, and a support mechanism which is interposed between the pair of holding sections of the fixing bracket and the steering column and supports the steering column in a manner that the steering column is slidable, in which the support mechanism includes a spring member which is interposed between one of the pair of holding sections and the steering column and a rigid body which is interposed between the other of the pair of holding sections and the steering column. Here, the rigid body includes a member which is formed from a stiff material which has a sufficiently high spring constant compared to the spring member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
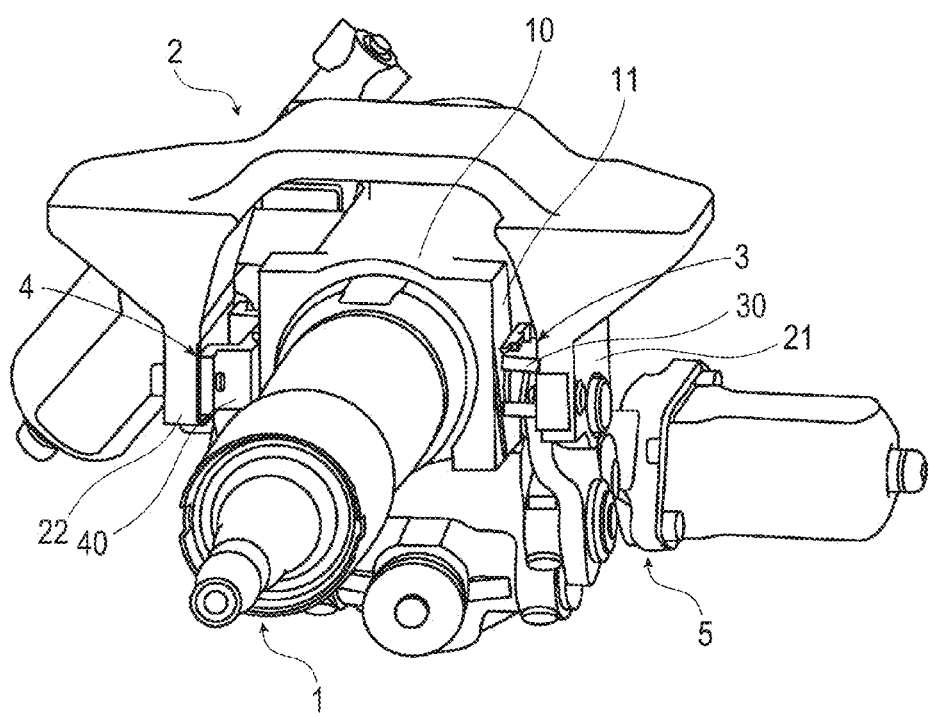
FIG. 1 is a perspective diagram illustrating an assembly state of a portion of a steering apparatus of an embodiment disclosed here.

Preferred embodiments disclosed here will be described below with reference to the drawings. Using the illustration in FIG. 1 of a portion of a steering apparatus according to an embodiment disclosed here, the present embodiment is configured such that a steering column 1 is supported so as to be able to oscillate with respect to a vehicle body (not shown in the drawings) and it is possible to adjust an operating position of a steering wheel (not shown in the drawings). The steering column 1 is configured so as to be mechanically or electrically linked to a steering mechanism (not shown in the drawings), the steering mechanism is driven according to the operation of the steering wheel, and the steering wheel (not shown in the drawings) is steered via a wheel steering mechanism (not shown in the drawings).

A fixing bracket 2 has a pair of opposing holding sections 21 and 22 which extend to a lower part of a vehicle, a support mechanism 3 of a spring member is mounted on one holding section 21, a support mechanism 4 of a rigid body is mounted on the other holding section 22, and the fixing bracket 2 is further configured by a sub-assembly on which a driving mechanism 5 is mounted. Then, when the sub-assembly is assembled on the steering column 1, an assembly is configured in a state where a main housing 10 is held in the fixing bracket 2, and is fixed to the vehicle body at the upper part of the fixing bracket 2. Thus, the support mechanisms 3 and 4 are in a state of being respectively interposed between the holding sections 21 and 22 of the fixing bracket 2 and the main housing 10, and thereby the main housing 10 is slidably supported. Here, since the driving mechanism 5 is similar to electric tilt mechanisms in the related art, description thereof is omitted, and the steering column 1 oscillates and a tilt operation is performed according to the control of the driving mechanism 5.

Figure 2:
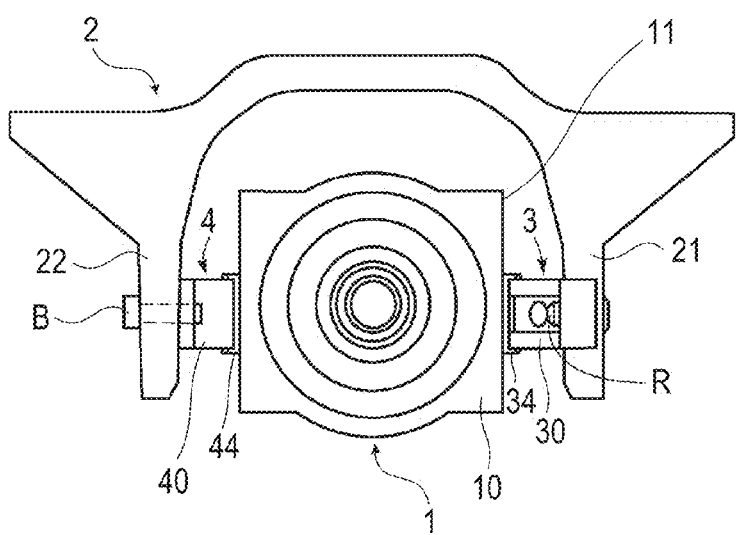
FIG. 2 is a front side diagram of a fixing bracket section in the embodiment disclosed here.
Figure 3:
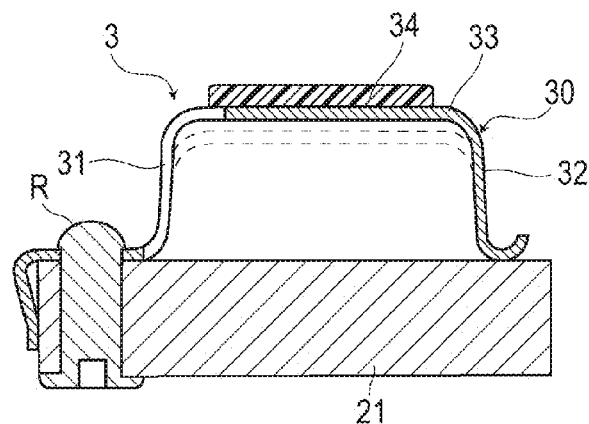
FIG. 3 is a sectional diagram illustrating a spring member and a support structure therefor provided in the embodiment disclosed here.

The support mechanism 3 of the present embodiment is arranged at the right side of the fixing bracket 2 as shown in FIG. 1 and FIG. 2, and is configured such that the main housing 10 (thus the steering column 1) from the side of the one holding section 21 is pressed in the shaft center direction of the main housing 10. For example as shown in FIG. 3, the support mechanism 3 includes a spring member 30 (with an approximate U shape in section) where first and second leg sections 31 and 32 substantially parallel to one another extend from both ends of a flat plate section 33, and a sliding member 34 made of a synthetic resin which is supported on a top surface of the flat plate section 33. Then, the first leg section 31 of the spring member 30 is fixed using a rivet R to the holding section 21 of the fixing bracket 2, and a free end of the second leg section 32 is supported so as to be slidable with respect to the holding section 21. Here, in FIG. 3, the outer form of the (one) spring member which is interposed on both sides of the steering column 1 in the manner of a device in the related art is illustrated by a broken line, the free length of the spring member 30 of the present embodiment is thereby set to be displayed large, but in this case, the spring constant drops and thereby a similar load may be set as spring members in the related art.

Figure 4:
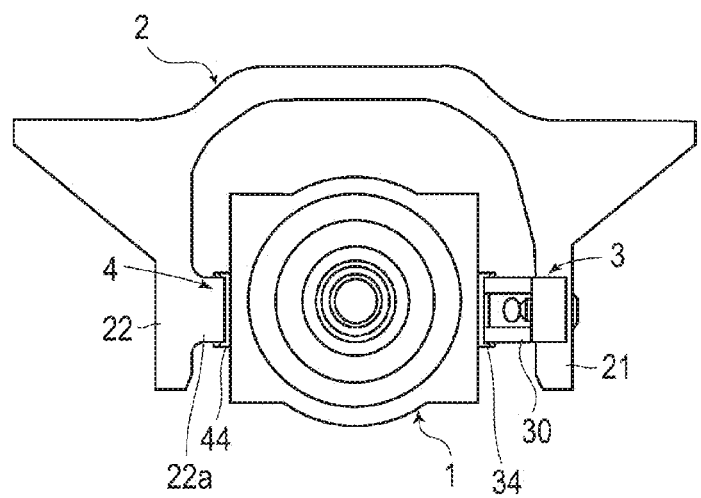
FIG. 4 is a front side diagram of a fixing bracket section in another embodiment disclosed here.

In contrast to this, the support mechanism 4 which is arranged on the left side of the fixing bracket 2 is configured by a rigid body 40 which is fixed to the other holding section 22 by, for example, a bolt B at a position which abuts the main housing 10, and a sliding member 44 made of a synthetic resin is supported on a top surface of the rigid body 40. Then, since the main housing 10 (thus the steering column 1) is held in a state of being press contacted on the sliding member 44 (thus the rigid body 40) as shown in FIG. 2 due to the biasing force of the spring member 30, it is possible to easily set the center position of the steering column 1 using the rigid body 40. Here, as shown in FIG. 4, a portion which corresponds to the rigid body 40 may be integrally formed on the holding section 22 (indicated by 22a in FIG. 4) as the support mechanism 4, and thereby it is possible to reduce the number of components. Accordingly, the rigid body 40 is made of metal in all of the embodiments, but may be set as a member which is formed from a stiff material which has a sufficiently high spring constant compared to the spring member 30.

Figure 5:
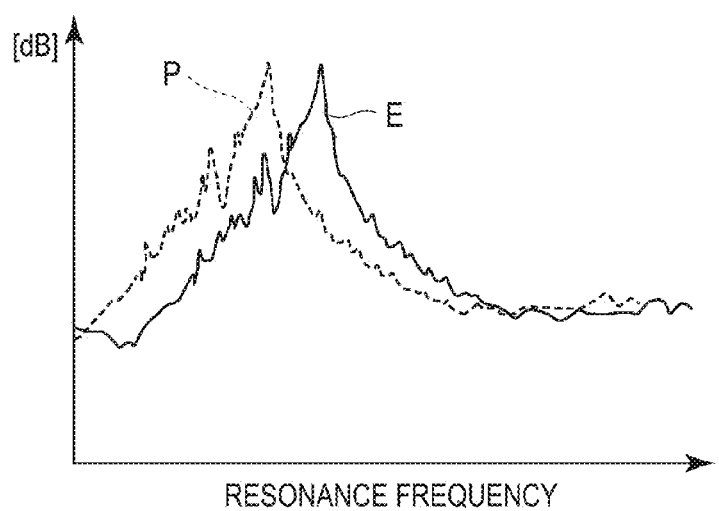
FIG. 5 is a graph which explains a comparison of left and right vibration rigidity in devices in the related art and the embodiment disclosed here.

Thus, the sliding member 34 is pressed in a planar section 11 of the main housing 10 using the spring member 30, and according to the reaction force thereof, since the sliding member 44 which is mounted on the rigid body 40 is pressed on the planar section 11 of the main housing 10, thereby it is possible to secure the stabilized holding pressure and it is possible to further improve left and right vibration rigidity. For example, as indicated by a solid line (E) in FIG. 5, resonance frequency at the peak time is high, that is, left and right vibration rigidity is high compared to characteristics of devices in the related art indicated by a broken line (P) and it is possible to secure favorable left and right vibration rigidity. Furthermore, it is possible to secure smooth movement with respect to the main housing 10 due to the sliding members 34 and 44, but alternatively or in addition to these, a coating treatment may be carried out with respect to at least one abutting surface of the spring member 30 and the rigid body 40 (or the sliding members 34 and 44) and the main housing 10 (the steering column 1).

An aspect of this disclosure is directed to a steering apparatus for a vehicle, capable of adjusting an operating position of a steering wheel with respect to a vehicle body, including a steering column which supports the steering wheel at a rear end, arranges a center of oscillation with respect to the vehicle body is arranged in front thereof, and support the steering wheel so as to be able to oscillate around the center of oscillation, a fixing bracket which holds the steering column between a pair of opposing holding sections which extend to a lower part and fixes an upper part to the vehicle body, and a support mechanism which is interposed between the pair of holding sections of the fixing bracket and the steering column and supports the steering column in a manner that the steering column is slidable, in which the support mechanism includes a spring member which is interposed between one of the pair of holding sections and the steering column and a rigid body which is interposed between the other of the pair of holding sections and the steering column. Here, the rigid body includes a member which is formed from a stiff material which has a sufficiently high spring constant compared to the spring member.

In the steering apparatus, the spring member may be formed such that a first leg section and a second leg section substantially parallel to one another extend from both ends of a flat plate section, and arranged such that the first leg section is fixed to one holding section and the second leg abuts the one holding section. In addition, the rigid body may be configured so as to be integrally formed on the other holding section.

Furthermore, the steering apparatus may further include a sliding member which is supported on an abutting surface of the spring member with the steering column and a sliding member which is supported on an abutting surface of the rigid body with the steering column. Here, the sliding member may be formed of a synthetic resin. Alternatively, in the steering apparatus, at least one abutting surface of the spring member and the steering column may be subjected to coating treatment and at least one abutting surface of the rigid body and the steering column may be subjected to coating treatment.

The aspect of this disclosure is configured as described above and exhibits the following effects. That is, in the steering apparatus of this disclosure, a support mechanism which supports the steering column in the manner that the steering column is slidable is configured by a spring member which is interposed between one of the pair of holding sections and the steering column and a rigid body which is interposed between the other of the pair of holding sections and the steering column, therefore it is possible to easily set the center position of the steering column using the rigid body and it is possible to secure a stabilized holding pressure using the spring member. Moreover, it is possible to further improve left and right vibration rigidity and it is possible to suitably hold the steering column.

In the steering apparatus, in the case where the spring member is formed such that a first leg section and a second leg section substantially parallel to one another extend from both ends of a flat plate section, the first leg section is fixed to one holding section, and the second leg section abuts one holding section, it is possible to easily perform assembly. In addition, if there is a configuration where the rigid body is integrally formed on the other holding section, it is possible to reduce the number of components and assembly is further simplified.

Furthermore, in the steering apparatus, when the spring member and the rigid body respectively support the sliding member on the abutting surface of the steering column, and/or when at least one abutting surface of the sliding member and the steering column and at least one abutting surface of the rigid body and the steering column are subjected to coating treatment, it is possible to secure smooth movement with respect to the steering column.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A steering apparatus for a vehicle capable of adjusting an operating position of a steering wheel with respect to a vehicle body, comprising:
    a steering column which supports the steering wheel at a rear end, arranges a center of oscillation with respect to the vehicle body in front thereof, and supports the steering wheel so as to oscillate around the center of oscillation;
    a fixing bracket which holds the steering column between a pair of opposing holding sections which extend to a lower part, and fixes an upper part to the vehicle body;
    a support mechanism which is interposed between the pair of holding sections of the fixing bracket and the steering column and supports the steering column in a manner that the steering column is slidable relative to the support mechanism; and
    the support mechanism including only one spring member, which is interposed between one of the pair of holding sections and the steering column, the support mechanism further including a rigid body which is interposed between the other of the pair of holding sections and the steering column, the steering column being slidable relative to the spring member and the rigid body.

2. The steering apparatus for a vehicle according to claim 1,
    wherein the spring member is formed such that a first leg section and a second leg section substantially parallel to one another extend from both ends of a flat plate section, and arranged such that the first leg section is fixed to one holding section and the second leg section abuts the one holding section.

3. The steering apparatus for a vehicle according to claim 1,
    wherein the rigid body is integrally formed on the other holding section.

4. The steering apparatus for a vehicle according to claim 1, further comprising:
    a sliding member which is supported on a first surface of the spring member abutting with the steering column; and
    a sliding member which is supported on a second surface of the rigid body abutting with the steering column.

5. The steering apparatus for a vehicle according to claim 1,
    wherein at least one abutting surface of the spring member and the steering column is subjected to coating treatment and at least one abutting surface of the rigid body and the steering column is subjected to coating treatment.

6. The steering apparatus for a vehicle according to claim 1, wherein:
    the spring member includes a free end slidable with respect to the one of the pair of holding sections, and
    at least part of the spring member is fixed to the one of the pair of holding sections, the at least part being a portion of the spring member other than the free end.

7. A steering apparatus for a vehicle capable of adjusting an operating position of a steering wheel with respect to a vehicle body, comprising:
    a steering column which supports the steering wheel at a rear end, arranges a center of oscillation with respect to the vehicle body in front thereof, and supports the steering wheel so as to oscillate around the center of oscillation;
    a fixing bracket which holds the steering column between a pair of opposing holding sections which extend to a lower part, and fixes an upper part to the vehicle body;
    a support mechanism which is interposed between the pair of holding sections of the fixing bracket and the steering column and supports the steering column in a manner that the steering column is slidable;
    the support mechanism including a spring member which is interposed between one of the pair of holding sections and the steering column and a rigid body which is interposed between the other of the pair of holding sections and the steering column; and
    the spring member being formed such that a first leg section and a second leg section substantially parallel to one another extend from both ends of a flat plate section, and arranged such that the first leg section is fixed to one holding section and the second leg section abuts the one holding section.

8. A steering apparatus for a vehicle capable of adjusting an operating position of a steering wheel with respect to a vehicle body, comprising:
    a steering column including a front end and a rear end, the rear end supporting the steering wheel such the steering wheel is configured to oscillate about a center of oscillation;
    a fixing bracket including opposing first and second holding sections which extend to a lower part of the fixing bracket, and an upper part fixed to the vehicle body, the steering column being held between the first and second holding sections;

a first support mechanism interposed between and contacting the first holding section and the steering column, supporting the steering column in a sliding manner, and exerting a first spring force against the steering column; and a second support mechanism interposed between and contacting the second holding section and the steering column, supporting the steering column in a sliding manner, and exerting a second spring force against the steering column, the first spring force being greater than the second spring force.

* * * * *